United States Patent
Watanabe (10) Patent No.: US 7,054,499 B2
(45) Date of Patent: May 30, 2006

(54) CORRECTION DATA GENERATION METHOD AND IMAGING APPARATUS

(75) Inventor: Nobuyuki Watanabe, Yokohama (JP)

(73) Assignee: Olympus Optical Co., Ltd., Tokyo (JP)

( * ) Notice: Subject to any disclaimer, the term of this patent is extended or adjusted under 35 U.S.C. 154(b) by 720 days.

(21) Appl. No.: 10/254,846

(22) Filed: Sep. 26, 2002

(65) Prior Publication Data

US 2003/0063815 A1    Apr. 3, 2003

(30) Foreign Application Priority Data

Sep. 28, 2001   (JP)   ............................ 2001-304528
Aug. 6, 2002    (JP)   ............................ 2002-228387

(51) Int. Cl.
    *G06K 9/40*    (2006.01)
(52) U.S. Cl. ........................................ 382/255; 396/82
(58) Field of Classification Search ................ 382/254, 382/255, 260, 274; 396/72, 75, 77, 81, 82, 396/85, 87; 369/112.02, 112.24, 112.12; 359/388

See application file for complete search history.

(56) References Cited

U.S. PATENT DOCUMENTS 4,937,619 A * 6/1990 Fukuda et al. ................. 355/53
5,003,336 A * 3/1991 Karasaki et al. ............... 396/92
6,314,240 B1 * 11/2001 Okawara ....................... 396/81
6,686,946 B1 * 2/2004 Masuda et al. ............. 347/236
2003/0053393 A1 * 3/2003 Shimano et al. ........ 369/112.02
2003/0076587 A1 * 4/2003 Stelzer et al. ................ 359/388

FOREIGN PATENT DOCUMENTS

JP           3035992           2/2000

* cited by examiner

*Primary Examiner*—Yon J. Couso
(74) *Attorney, Agent, or Firm*—Stevens, Davis, Miller & Mosher, LLP

(57) ABSTRACT

A correction data generation method generates correction data used to correct the focal plane position of a lens in consideration of symmetry of PSF (point spread function) in an optical system. The binarization step binarizes the intensity of the PSF using a predetermined threshold value level. The minimum circle calculation step calculates a minimum circle that circumscribes the PSF binarized in the binarization step for each of a plurality of regions of an image. The PSF evaluation step evaluates the PSF of the entire image on the basis of the weighted average value of the radii of the minimum circles for the plurality of regions of the image, which are calculated in the minimum circle calculation step. The correction data calculation step calculates correction data used to correct the focal plane position of the lens on the basis of an evaluation value acquired in the PSF evaluation step.

12 Claims, 8 Drawing Sheets

Radius of circumscribed circle r1 > r2

$1/(A \cdot s1^2 + B \cdot feret(e1)^2) < 1/(A \cdot s2^2 + B \cdot feret(e2)^2)$

Luminance level

FIG. 12B

Luminance difference

CORRECTION DATA GENERATION METHOD AND IMAGING APPARATUS

CROSS-REFERENCE TO RELATED APPLICATIONS

This application is based upon and claims the benefit of priority from the prior Japanese Patent Applications No. 2001-304528, filed Sep. 28, 2001; and No. 2002-228387, filed Aug. 6, 2002, the entire contents of both of which are incorporated herein by reference.

BACKGROUND OF THE INVENTION

1. Field of the Invention

The present invention relates to a correction data generation method and imaging apparatus.

2. Description of the Related Art

Along with the development of LSI techniques, two-dimensional (2D) image processes using digital filters have been performed widely. The 2D image processes include a low-pass filter process, high-pass filter process, convolution filter process, and the like. In this convolution filter process, image data of N×N (N is an integer equal to or larger than 2) pixels having a pixel to be processed as the center are multiplied by predetermined weighting coefficients, and the products are added to form image data of the pixel to be processed.

When a digital filter is designed in correspondence with the characteristics of an optical system, a PSF (Point Spread Function) of the optical system is obtained by experiments or calculations in optical design, and a filter is designed to complement the characteristics. Normally, rotation asymmetric components (coma, astigmatism) of the aberration of the optical system increase as the distance from the optical axis becomes larger. In an ideal inverse filter, a rotation asymmetrical digital filter is formed if rotation asymmetry of the PSF is taken into consideration.

It is impractical for a rotation asymmetrical digital filter to have data as different parameters for respective locations of an image, since each pixel must have data with a matrix size of a filter. For example, when an image consists of M×M pixels, the total number of coefficients in the aforementioned N×N sharpen filter amounts to $M^2 \times N^2$, thus requiring a large memory.

An arrangement that can simultaneously implement geometric conversion and sharpness recovery in a filter based on a pipeline process is disclosed in Japanese Patent No. 3,035,992. This arrangement does not consider rotation symmetry, and must have different coefficient for respective locations.

In consideration of practical processing cost (circuit scale, processing speed), it is preferable to approximate the PSF to a function which has rotation symmetry. As will be described below, a parametric digital filter can be formed by a relatively simple method. To attain a normal use purpose of an imaging device, it is effective to design an inverse filter within a range in which the PSF can be considered to have rotation symmetry, in terms of recovery of frequency components.

In order to parametrically define a digital filter, some methods are available. In an example of a frequency recovery filter having a 3×3 kernel size, a high-frequency emphasis filter H is set by:

$$H = \begin{bmatrix} -0.5 & -1 & -0.5 \\ -1 & 7 & -1 \\ -0.5 & -1 & -0.5 \end{bmatrix} \quad (1)$$

A parametric recovery filter that adjusts the distribution coefficients of this filter H is given by:

$$H_0 = \alpha I + (1-\alpha) H \quad (2)$$

$$I: \text{unit matrix} = \begin{bmatrix} 0 & 0 & 0 \\ 0 & 1 & 0 \\ 0 & 0 & 0 \end{bmatrix}$$

If $\alpha$ is changed, the characteristics of the recovery filter can be adjusted, and a higher-frequency emphasis filter is obtained with decreasing $\alpha$.

As another method of designing a parametric filter, a method of approximating the PSF by an exponential function using some criteria of the approximation, and calculating an optimal inverse filter by the method of least squares with respect to that exp function is used. An exponential function is given by:

$$H(z_{i,j}) = \sum_{i,j \in E} k_{i,j} z_{i,j} \quad (3)$$

$$k_{i,j} = \frac{1}{I} \exp(-d \cdot r)$$

$$r = \sqrt{i^2 + j^2}$$

$$I = \sum_{i,j \in E} \exp(-d \cdot r)$$

where i and j are indices when the central position of an axis symmetric PSF is expressed by (0, 0). Coefficients of an inverse filter are calculated in correspondence with a change in parameter d. If d is small, the spread of the blur is large, and the high-frequency emphasis effect of the inverse filter is large. In order to suppress errors (aliasing) in a high-frequency range, the high-frequency range may be relaxed without using a $\delta$ function as an objective function for the inverse filter. As a design method of a general inverse filter, a calculation example of a least square filter will be described below. In the following example, a target response function is a $\delta$ function.

If h(i, j) represents a PSF defined by:

region $i, j | |i| \leq P, |j| \leq Q,|$ a coefficient matrix obtained by expressing this function using a linear filter is given by:

$$h = \begin{bmatrix} h(-P,-Q) & \cdots & h(-P,0) & \cdots & h(-P,Q) \\ \vdots & \ddots & \vdots & \ddots & \vdots \\ h(0,-Q) & & h(0,0) & & h(0,Q) \\ \vdots & \ddots & \vdots & \ddots & \vdots \\ h(P,-Q) & \cdots & h(P,0) & \cdots & h(P,Q) \end{bmatrix} \quad (4)$$

The Z-transform of the transfer function of the PSF with respect to impulse is given by:

$$Y(z) = Y(z_1, z_2) = H(z_1, z_2)\delta(0, 0) = \sum_{i,j=-P,-Q}^{P,Q} h(i, j) \cdot z_1^{-i} z_2^{-j} \quad (5)$$

Also, an FIR inverse filter to be designed is defined by:

$$f = \begin{bmatrix} f(-P, -Q) & \cdots & f(-P, 0) & \cdots & f(-P, Q) \\ \vdots & \ddots & \vdots & \ddots & \vdots \\ f(0, -Q) & & f(0, 0) & & f(0, Q) \\ \vdots & \ddots & \vdots & \ddots & \vdots \\ f(P, -Q) & \cdots & f(P, 0) & \cdots & f(P, Q) \end{bmatrix}$$

Applying the PSF to an inverse filter yields:

$$r(k, l) = \sum_{i=-P}^{P} \sum_{j=-Q}^{Q} h(k - i, l - j) f(k, l) \quad (6)$$

Based on approximated least square errors, filter f is given by:

$$\sum_{i=-m}^{m} \sum_{j=-m}^{m} a(p - i, q - j) \cdot f(i, j) = \quad (7)$$

$$h(-p, -q)a(p - i, q - j) = \sum_{k=-m}^{m} \sum_{l=-m}^{m} h(k, l) \cdot h(k + p - i, l + q - j)$$

Matrix expression of equation (14) for P=Q=m for the sake of simplicity yields:

$$Ax=b \quad (8)$$

Assume that the contents of x and b have $(2m+1) \times (2m+1) = 4m^2+4m+1$ elements:

$$b = \begin{bmatrix} \underbrace{\underline{h(m,m)}, \quad \underline{h(m,m-1)}, \ldots, \underline{h(m,m)},}_{2m+1 \text{ elements}} \underbrace{\underline{h(m-1,m)}, \ldots, \underline{h(m-1,m)}, \ldots,}_{2m+1 \text{ elements}} \\ p=-m, q=-m \quad p=-m, q=-m+1 \quad p=-m, q=m \quad p=-m+1, q=-m \quad p=-m+1, q=m \\ \underbrace{\underline{h(-m,m)}, \ldots, \underline{h(-m,-m)},}_{2m+1 \text{ elements}} \\ p=m, q=-m \quad p=m, q=m \end{bmatrix}^T \quad (9)$$

$$x = \begin{bmatrix} \underbrace{\underline{f(-m,-m)} \quad \underline{h(-m,-m+1)}, \ldots, \underline{f(-m,m)},}_{2m+1 \text{ elements}} \\ p=-m, q=-m \quad p=-m, q=-m+1 \quad p=-m, q=m \\ \underbrace{\underline{f(-m+1,-m)}, \ldots, \underline{f(-m+1,m)}, \ldots,}_{2m+1 \text{ elements}} \underbrace{\underline{f(m,-m)}, \ldots, \underline{f(m,m)}}_{2m+1 \text{ elements}} \\ p=-m+1, q=-m \quad p=-m+1, q=m \quad p=m, q=-m \quad p=m, q=m \end{bmatrix}^T \quad (10)$$

Such inverse filter of the exponential function can be used as a parametric sharpen filter, the degree of sharpening of which can be varied by designating the value d in equations (3). Hence, when distances (image heights) from the center of the imager plane are assigned in accordance with pixel positions on the imager plane, and the values d are designated in correspondence with the image heights, shift-variant sharpness recovery can be implemented. Compared to the aforementioned sharpen filter having asymmetric coefficients, the number of coefficients to be stored is overwhelmingly smaller in such parametric sharpen filter.

However, when the inverse filter is limited to the range in which the PSF can be approximated by a rotation symmetric function, as described above, if off-axis astigmatism is large like in, especially, a single-lens, wide-angle imaging system, the image quality can be improved only near the axis.

It is, therefore, an object of the present invention to provide a correction data generation method and imaging apparatus, which can compensate for deterioration of off-axis optical performance without using any rotation asymmetric sharpness recovery filter.

BRIEF SUMMARY OF THE INVENTION

In order to achieve the above object, according to the first aspect of the present invention, there is provided a correction data generation method of generating correction data used to correct a focal plane position of a lens in consideration of symmetry of PSF in an optical system, comprising:

a binarization step of binarizing an intensity of the PSF using a predetermined threshold value level;

a minimum circle calculation step of calculating a minimum circle that circumscribes the PSF binarized in the binarization step for each of a plurality of regions of an image;

a PSF evaluation step of evaluating the PSF of the entire image on the basis of a weighted average value of radii of the minimum circles for the plurality of regions of the image, which are calculated in the minimum circle calculation step; and a correction data calculation step of calculating correction data used to correct the focal plane position of the lens on the basis of an evaluation value acquired in the PSF evaluation step.

The second aspect of the present invention relates to the correction data generation method according to the first aspect of the present invention, and the weight is given in accordance with a distance from a center of an image plane.

According to the third aspect of the present invention, there is provided a correction data generation method of generating correction data used to correct a focal plane position of a lens in consideration of symmetry PSF in an optical system, comprising:

the blob formation step of binarizing the intensity of PSF images with an adaptive threshold level and forming blobs;

the measurement step of measuring perimeters and areas of the blobs of the PSF images binarized in the blob formation step for a plurality of regions of an image;

the calculation step of calculating ratios between the perimeters and areas of the blobs for the plurality of regions of the image calculated in the measurement step;

the PSF evaluation step of evaluating the PSF of the entire image on the basis of the weighted average value of the calculated ratios between perimeters and areas for the plurality of regions of the image; and the correction data calculation step of calculating correction data used to correct the focal plane position of the lens on the basis of an evaluation value acquired in the PSF evaluation step.

The fourth aspect of the present invention relates to the correction data generation method according to the third aspect of the present invention, and the weight is given in accordance with a distance from a center of an image plane.

According to the fifth aspect of the present invention, there is provided a correction data generation method of generating correction data used to correct a focal plane position of a lens in consideration of symmetry of a spread of a PSF (point spread function) in an optical system, comprising:

the binarization step of binarizing an intensity of the PSF using a predetermined threshold value level;

the ellipse calculation step of calculating an ellipse that circumscribes the PSF binarized in the binarization step;

the ratio calculation step of calculating a ratio between major and minor axes (feret ratio) of the ellipse calculated in the ellipse calculation step for each of a plurality of regions of an image;

the PSF evaluation step of evaluating the PSF of the entire image on the basis of a weighted average value of feret ratios for the plurality of regions of the image calculated in the ratio calculation step; and the correction data calculation step of calculating correction data used to correct the focal plane position of the lens on the basis of an evaluation value acquired in the PSF evaluation step.

The sixth aspect of the present invention relates to the correction data generation method according to the fifth aspect of the present invention, and the weight is given in accordance with a distance from a center of an image plane.

According to the seventh aspect of the present invention, there is provided an imaging apparatus comprising:

a controller which controls a focal point of a lens;

a correction data storage unit which stores correction data of a focal point, which is generated in consideration of symmetry of PSF in an optical system; and a focal plane correction unit which corrects a focal plane position set by the controller on the basis of the correction data stored in the correction data storage unit.

The eighth aspect of the present invention relates to the imaging apparatus according to the seventh aspect of the present invention, and the apparatus further comprises an imaging lens having a function of changing an aperture and zoom ratio, and the correction data storage unit stores correction data corresponding to an aperture value and zoom ratio of the imaging lens, and the apparatus further comprises an interpolation calculation unit which calculates correction data corresponding to the aperture value and the zoom ratio of the imaging lens on the basis of the correction data stored in the correction data storage unit.

The ninth aspect of the present invention relates to the imaging apparatus according to the eighth aspect of the present invention, and the imaging lens has a storage unit which stores the correction data, and supplies the correction data to the controller to correct a focal plane position.

The 10th aspect of the present invention relates to the imaging apparatus according to the ninth aspect of the present invention, and the apparatus further comprises a recovery unit which recovers sharpness of an image using a sharpen filter having rotation symmetric coefficients.

According to the 11th aspect of the present invention, there is provided a correction data generation method of generating correction data used to correct a focal plane position of a lens in consideration of symmetry of PSF in an optical system, comprising:

the step of calculating direction dependence of a contrast distribution of an image taken through the optical system for a plurality of regions of an image; and the step of correcting the focal plane position of the optical system to minimize the calculated direction dependence of the contrast distribution of the image in the entire image.

The 12th aspect of the present invention relates to the correction data generation method according to the 11th aspect of the present invention, and the step of calculating the direction dependence for the plurality of regions of the image, comprises:

the step of calculating edge energies for respective directions on the basis of differences between a pixel of interest and pixels which neighbor the pixel of interest in a specific direction in a predetermined region;

the step of evaluating a spread of a PSF in the predetermined region on the basis of absolute values of the calculated edge energies, and evaluating blur asymmetry on the basis of a ratio of the edge energies in the respective directions; and the step of correcting the focal plane position of the lens so that evaluation values of the spread and asymmetry of the PSF fall within a predetermined range.

The 13th aspect of the present invention relates to the correction data generation method according to the 12th aspect of the present invention, and the step of calculating the edge energies for respective directions in the predetermined region, includes the step of:

evaluating contrast on the basis of absolute values of evaluation values, which represents contrasts in respective direction and are given by:

$$SF_x = \sum_{i=0,255} |s_{0x}(i) - s_{3x}(i)|$$

$$SF_y = \sum_{i=0,255} |s_{0y}(i) - s_{3y}(i)|$$

where $S_{0x}(i)$ and $S_{0y}(i)$ are histograms of difference values i between a pixel of interest, and horizontally and vertically neighboring pixels, and $S_{3x}(i)$ and $S_{3y}(i)$ are histograms of difference values similarly obtained in an image that has undergone a smoothing filter process to reduce high-frequency components of a spatial frequency of the image, and evaluating a direction dependence of the contrast on the basis of a ratio $SF_x/SF_y$ of the contrasts in the respective directions.

According to the 14th aspect of the present invention, there is provided an imaging apparatus for correcting a focal plane position of a lens using correction data generated by a correction data generation method, which includes:

upon generating correction data used to correct a focal plane position of a lens in consideration of symmetry of PSF in an optical system, the step of calculating direction dependence of a contrast distribution of an image taken through the optical system for a plurality of regions of an image; and the step of correcting a focal plane position of the optical system to minimize the calculated direction dependence of the contrast distribution of the image in the entire image, the apparatus comprising:

a controller which controls a focal point of the lens;

a focal plane correction unit which corrects a focal plane position set by the controller on the basis of the correction data; and a recovery unit which recovers sharpness of an image using a sharpen filter having rotation symmetric coefficients with respect to image data imaged using the lens, the focal plane position of which has been corrected by the focal plane correction unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will be described in detail hereinafter with reference to the accompanying drawings. In this embodiment, when the PSF characteristics of an optical system have rotation asymmetry like off-axis astigmatism, the influence of rotation asymmetric spread is reduced, and image quality is improved by a sharpen filter having a filter kernel of rotation symmetric coefficients.

FIRST EMBODIMENT

Figure 1:
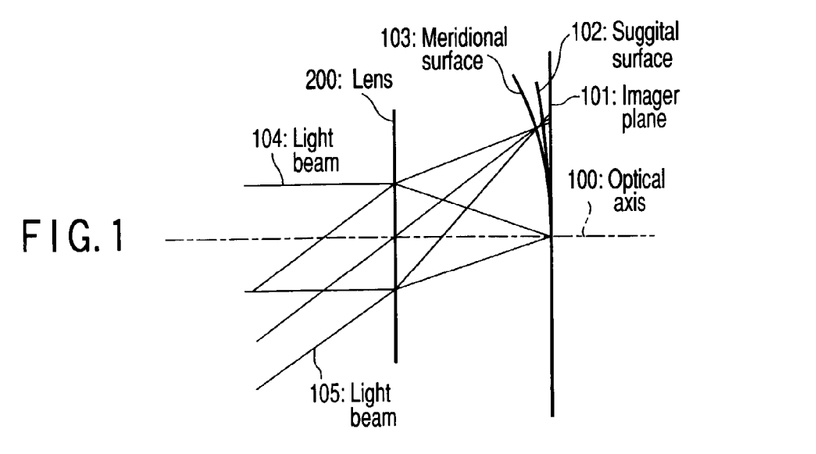
FIG. 1 shows an optimal layout that exhibits the best MTF (imaging performance of an optical system) near the optical axis.

The first embodiment of the present invention will be described first. FIG. 1 shows an optical layout that exhibits the best MTF (imaging performance of an optical system) near the optical axis and the optical system has an astigmatism. Light rays are focused by a lens 200 having an optical axis 100 and form an image on an imager plane 101. Reference numeral 104 denotes a light beam focused on the optical axis; and 105, a light beam focused off the optical axis. At this time, the lens 200 suffers astigmatism, and off-axis positions where a meridional surface 103 and suggital surface 102 are separated must be taken into consideration. The meridional surface 103 is a surface on which light rays converge most in the tangential direction of a concentric circle having the optical axis as the center, and the suggital surface 102 is a surface on which light rays are most focused in a direction perpendicular to that tangential direction.

Therefore, when a point light source is observed via this lens, light rays are focused while collapsing in the vertical or horizontal direction. In this way, a phenomenon that the focal plane varies depending on the direction to focus is called astigmatism.

FIG. 1 illustrates that the astigmatism becomes larger with increasing image height or the distance from the optical axis.

Recovery performance in a sharpening linear filter having a filter kernel of symmetric coefficients, which is used in an image process, will be explained below. In general, recovery is easier in the order of the following conditions 1) to 4) of a point spread function (PSF) that represents the lens performance.

1) Rotation symmetric and small PSF
2) Asymmetric but small PSF
3) Rotation symmetric but large PSF
4) Rotation asymmetric and large PSF Therefore, the PSF preferably has rotation symmetry.

Figure 2A:
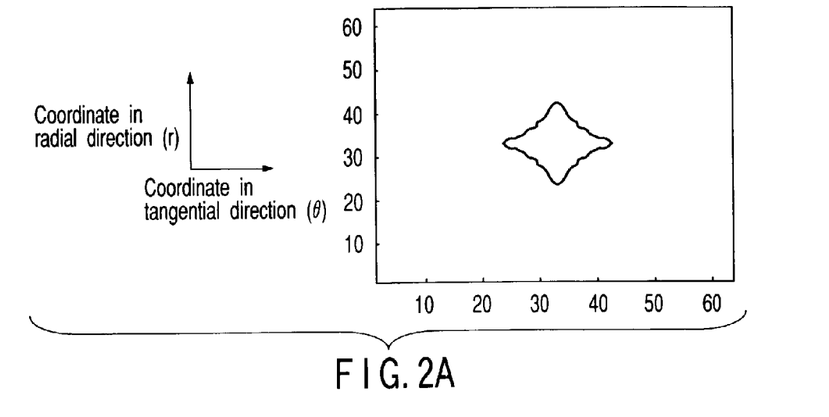
FIGS. 2A to 2C show typical off-axis PSF patterns observed when the imager plane is shifted in an optical system suffering astigmatism.
Figure 2B:
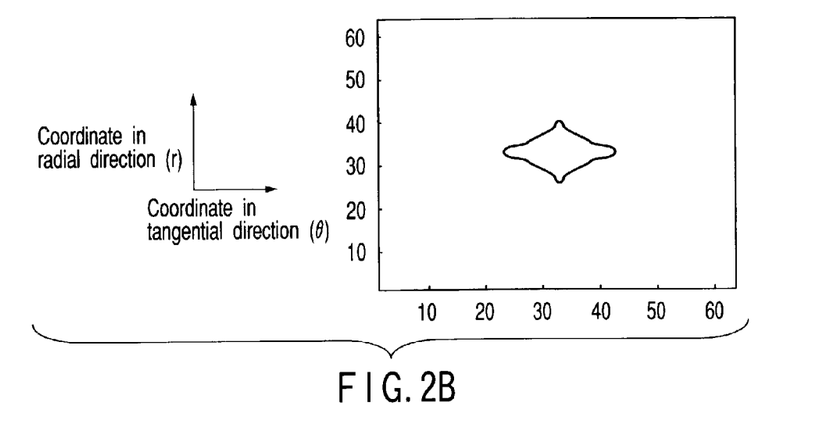
Figure 2C:
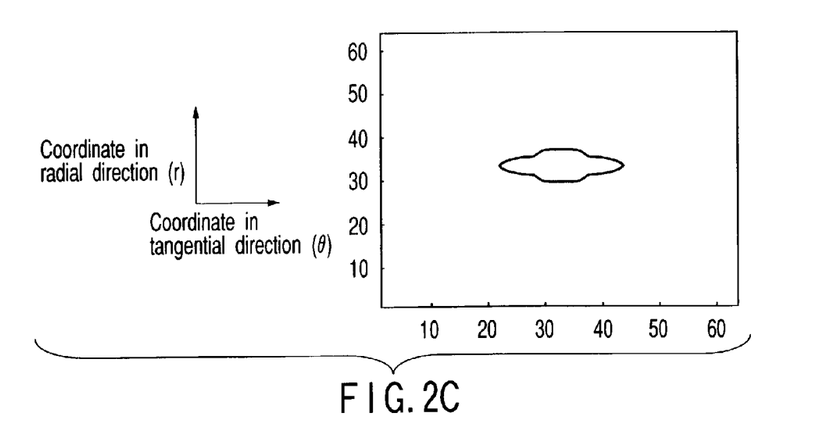

FIGS. 2A, 2B, and 2C respectively show typical off-axis PSF patterns observed when the imager plane is shifted in an optical system suffering astigmatism. As can be seen from FIGS. 2A to 2C, the PSF symmetry changes depending on the imager plane position. These patterns are illustrated according to a polar coordinate system (r–θ), the abscissa agrees with the tangential direction (θ) of a concentric circle having the optical axis as the center, and the ordinate agrees with the radial direction from the optical axis toward an off-axis position. In the examples shown in FIGS. 2A, 2B, and 2C, the PSF with the pattern shown in FIG. 2A is most easily recovered by a symmetric linear filter.

Hence, the PSF can be recovered by a rotation symmetric sharpen filter as long as it has a symmetric pattern, even when its spread is large to some extent. In the first embodiment, the imager plane of an imaging system is determined in consideration of the characteristics of a sharpen filter having rotation symmetric coefficients. The first embodiment will be described in detail below.

The imager plane is located at a position 201 (FIG. 3) closer to the lens 200 than a position 101 (FIG. 1). With this layout, the imaging performance (MTF) of an optical system without any correction using a filter deteriorates.

Figures 3, 4:
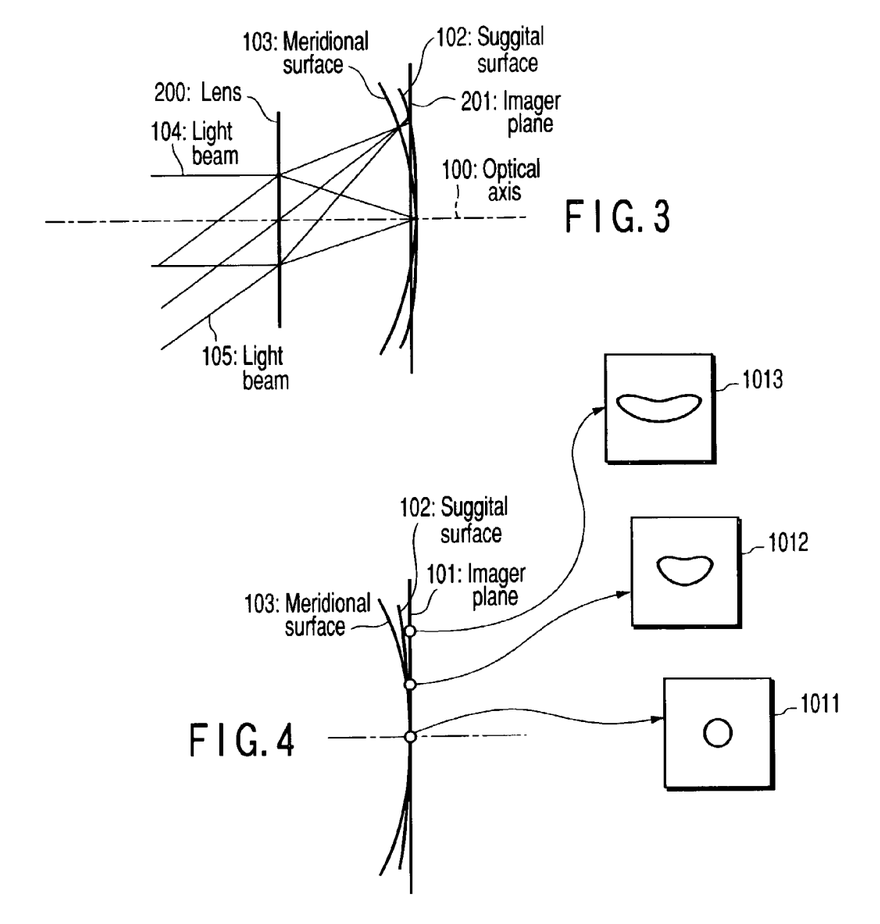
FIG. 3 shows an optical layout when the imager plane is closer to a lens 200.
FIG. 4 shows PSF patterns observed from positions (1) on the optical axis, (2) at an image height=0.3, and (3) at an image height=0.7, when the imager plane is located at a position 101.
Figure 5:
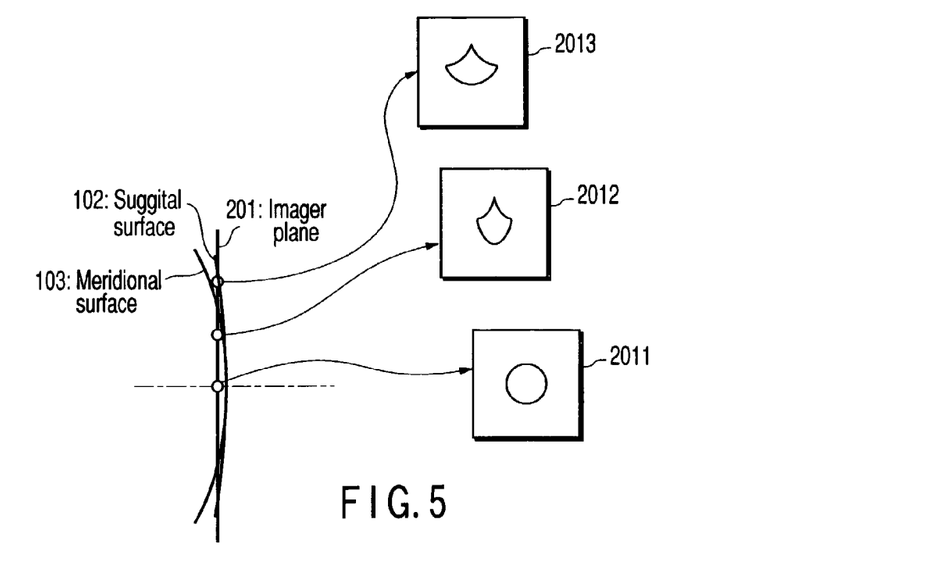
FIG. 5 shows PSF patterns observed from positions (1) on the optical axis, (2) at an image height=0.3, and (3) at an image height=0.7, when the imager plane is located at a position 201.

FIGS. 4 and 5 show PSF patterns observed from positions (1) on the optical axis, (2) at an image height=0.3, and (3) at an image height=0.7, when the imager plane is located at the positions 101 (FIG. 4) and 201 (FIG. 5). Since the optical system is designed to improve the on-axis MTF at the position 101 of the imager plane, the spread of the PSF is small (1011). By contrast, the spread of the PSF is large (2011) at the position 201 of the imager plane.

Upon comparison of off-axis PSF patterns at the large image height positions, a pattern 2013 has a smaller skirt than a pattern 1013. This indicates that the aforementioned case 4) approaches 3), and the degree of recovery by a rotation symmetry sharpen filter improves.

In this embodiment, criteria that determine the imager plane are set not only to obtain the best MTF but also in consideration of the symmetry of the spread of PSF. As an evaluation method, the PSF intensity is normalized by a maximum value, and is binarized by a threshold value of a pre-set intensity. A radius r of a circumscribed circle of a binary figure is obtained for each image height. If 1/r is large, the PSF is small and the MTF at that image height is good. Also, in consideration of viewability of an image, not only the total of 1/r at respective image heights becomes maximum, but also an image is divided into 10 sections to form weighting coefficients for respective image heights i/10|i=1 to 10, thus defining an evaluation function E by:

$$E = \sum_{i=1}^{i=10} \frac{W_i}{r_i} \quad (11)$$

The imager plane is always located at a position where this evaluation function is maximized. Note that a weighting coefficient $W_i$ is appropriately adjusted.

Figure 6:
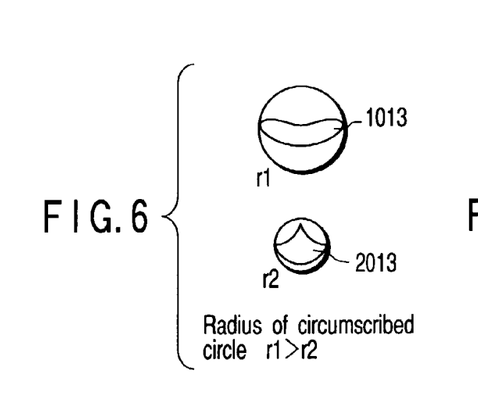
FIG. 6 is a view for explaining an embodiment that calculates a circumscribed circle of a PSF.

FIG. 6 is a view for explaining an embodiment that calculates a circumscribed circle of the PSF. As can be seen from FIG. 6, a radius r1 of a circle that circumscribes the off-axis PSF 1013 when the imager plane is located at the position 101 is larger than a radius r2 of a circle that circumscribes the off-axis PSF 2013 when the imager plane is located at the position 201.

In this manner, when evaluation is made using equation (11), symmetry is taken into consideration compared to the imager plane which is determined by evaluating the MTF on the basis of the frequency characteristics obtained by simply computing the Fourier transforms of the PSF.

Furthermore, when the evaluation function is formed using a method of evaluating the circularity of the PSF, an image, a large recovery effect of which is expected by the aforementioned sharpen filter process with symmetric coefficients can be obtained.

Figure 7:
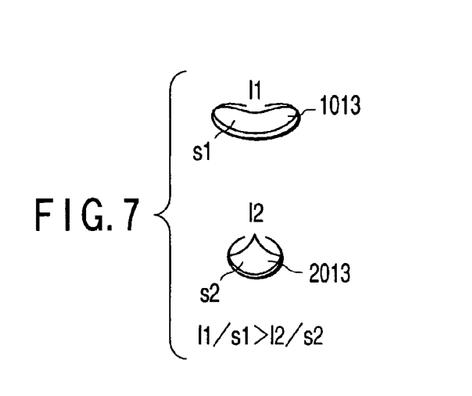
FIG. 7 is a view for explaining an embodiment that divides the perimeter (l1, l2) of a binary PSF by an area (S1, S2)

FIG. 7 is a view for explaining an embodiment that divides the perimeter (l) of the binary PSF by an area (S). In case of FIG. 7, since l1/s1>l2/s2, it is evaluated that the PSF 1013 has a symmetry more disturbed than that of the PSF 2013. Such evaluation is made for the entire image to yield:

$$E_2 = \sum_{i=1}^{10} W_i' \frac{S_i}{l_i} \quad (12)$$

where, $W_i'$ is the weighting coefficient depends on the distance from the center of imager plane.

The ratio (feret ratio) between the major and minor axes of an ellipse that circumscribes or inscribes the binary PSF may be adopted as a criterion.

Figure 8:
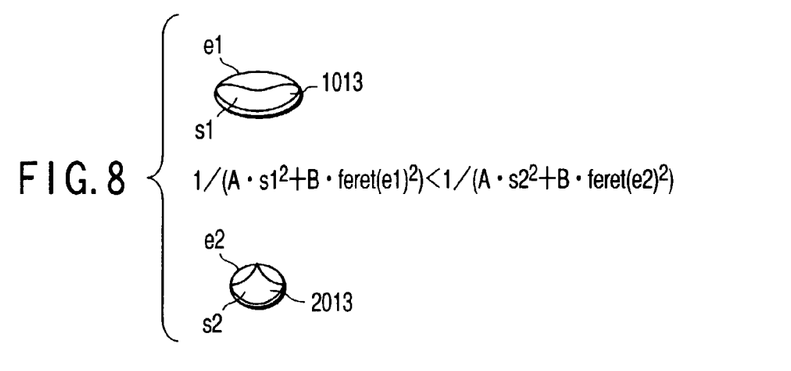
FIG. 8 is a view for explaining an embodiment that uses a feret ratio as a criterion.

FIG. 8 is a view for explaining an embodiment that uses a feret ratio as a criterion. In FIG. 8, e1 and e2 represent ellipses which respectively circumscribe the PSFs 1013 and 2013 and have minimum areas, and their feret ratios are represented by feret(e1) and feret(e2). If each individual evaluation function is given, using coefficients A and B, by:

$$Li = \frac{1}{A \cdot si^2 + B \cdot feret(ei)^2}$$

since the PSF 1013 has a larger feret ratio of the ellipse than the PSF 2013 in FIG. 8, it is evaluated that the PSF 1013 has lower Li (lower symmetry). An evaluation function formed in this way is given by:

$$E_3 = \sum_{i=1}^{10} W'' L_i$$

where, $W''$ is the weighting coefficient. Such evaluation functions E1 to E3 may be solely used, or may be used in combination with conventional MTF evaluation.

SECOND EMBODIMENT

The second embodiment of the present invention will be described below. In order to control AF in a monitor camera, digital camera, or the like, an imager plane shift amount is recorded in a ROM to correct the focal point in consideration of the characteristics of a sharpen filter, in addition to a focus detection mechanism based on prevalent image edge detection or a focus or phase detection using a separator lens.

Figure 9:
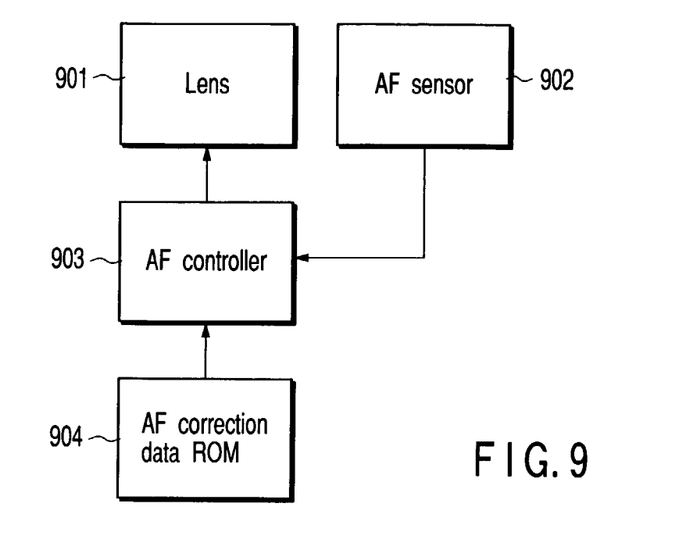
FIG. 9 is a block diagram showing the arrangement of an imaging apparatus according to the second embodiment of the present invention.

FIG. 9 is a block diagram showing the arrangement of an imaging apparatus according to the second embodiment of the present invention. The imaging apparatus of this embodiment comprises a lens 901, AF sensor 902, AF controller 903, and AF correction data ROM 904. Normal AF control is executed by the lens 901, AF sensor 902, and AF controller 903.

Upon completion of the AF control, an imager plane shift amount is read out from the AF correction data ROM 904 to correct the focal point. In this case, the data in the AF correction data ROM 904 may be selected in accordance with the object distance. As described above, according to the second embodiment, AF correction is done in consideration of the characteristics of the sharpen filter. Such focus correction can be applied to a film camera, and a case wherein a digitized image after imaging is corrected, in addition to the digital camera.

Figure 10:
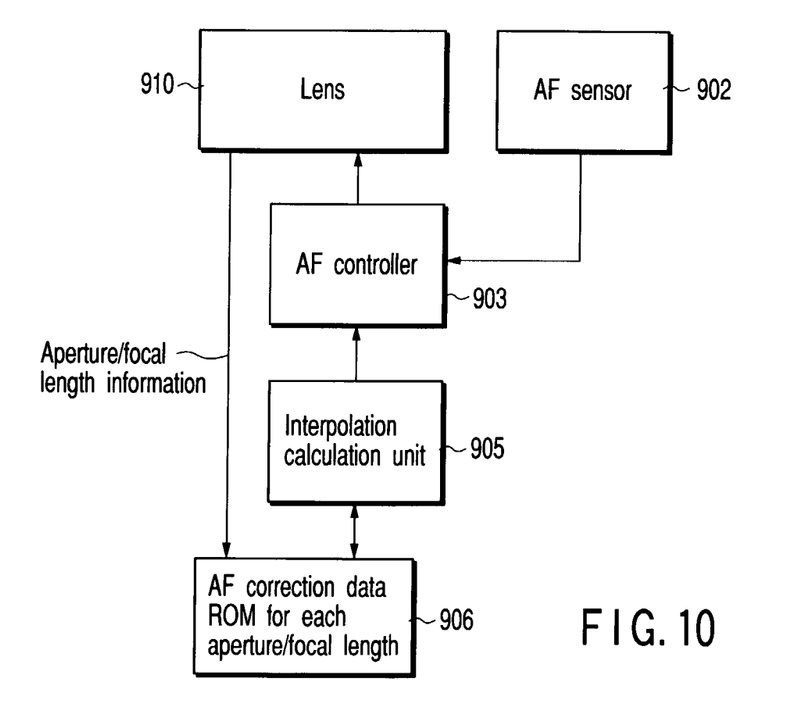
FIG. 10 is a block diagram showing a modification of the arrangement shown in FIG. 9.

FIG. 10 is a block diagram showing a modification of the arrangement shown in FIG. 9. In this modification, a zoom and aperture are variable. A lens 910 comprises an aperture change function and zoom change function. When an aperture and zoom ratio change, an AF correction data ROM 906 for each aperture/focal length comprises an LUT (lookup table) used to correct the focal length with respect to representative values of aperture and zoom ratio parameters.

An interpolation calculation unit 905 acquires the aperture, focal length information, and the like of the lens from the lens 910, and detects a correction value of a focal plane position corresponding to respective parameters. The interpolation calculation unit 905 confirms that each parameter is an intermediate setup value of representative values recorded in the AF correction data ROM 906 for each aperture/focal length, makes interpolation calculations of focal length correction parameters, and passes an AF control correction value to the AF controller 903.

Figure 11:
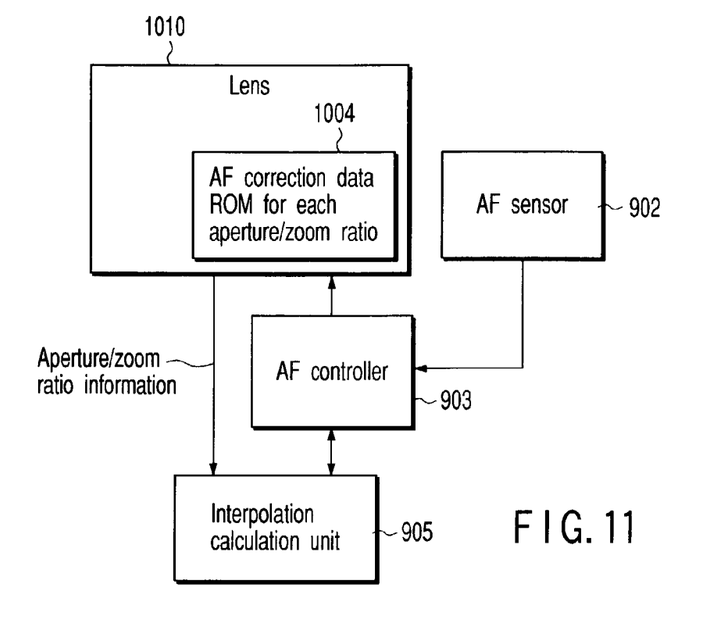
FIG. 11 is a block diagram showing another modification of the arrangement shown in FIG. 9.

Note that AF correction data may be read out from a ROM or the like equipped in the lens 910. FIG. 11 is a block diagram showing such modification. An AF correction data ROM 1004 for each aperture/zoom ratio, which is equipped in a lens 1010, outputs aperture/zoom ratio information of the lens 1010, and AF correction data corresponding to reference aperture/zoom ratio information to the interpolation calculation unit 905.

The interpolation calculation unit 905 calculates AF correction data that matches actual aperture/zoom ratio setup values by interpolation calculations on the basis of the AF correction data corresponding to reference aperture/zoom ratio information received from the AF correction data ROM 1004 for each aperture/zoom ratio in the lens 1010, and actual aperture/zoom ratio information, and passes it to the AF controller 903.

According to the aforementioned embodiment, since the imager plane of the imaging system is determined in consideration of the characteristics of the sharpen filter having rotation symmetric coefficients, the resolution characteristics especially in an off-axis region where the PSF becomes asymmetric can be improved compared to the conventional apparatus. Also, the optical performance and image process can be optimized together in consideration of the characteristics of the image processing.

THIRD EMBODIMENT

If a PSF is asymmetric, the degree of blur of an image exhibits direction dependence. That is, if a method of measuring direction-dependent contrasts is available, the rotation asymmetry of the PSF appears as an evaluation value.

The method of measuring direction-dependent contrasts will be described below. A delta histogram is known as an evaluation method of sharpness of a digital image, and is disclosed in, e.g., Society of Photographic Science and Technology of Japan Ed, "Fundamental of Photoengineering", CORONA PUBLISHING, CO., LTD., p. 559. This embodiment expands the delta histogram to evaluate direction-dependent contrasts.

Figure 12A:
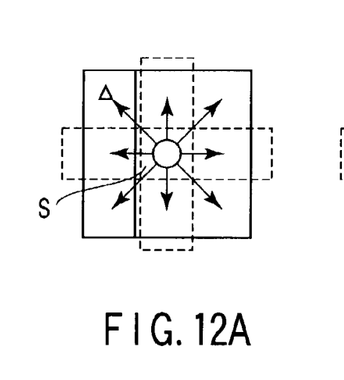
FIGS. 12A to 12D are views for explaining definition of direction-dependent SF factors in the third embodiment of the present invention.
Figure 12B:
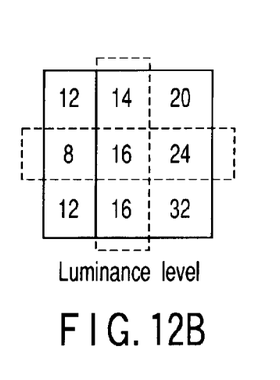
Figure 12C:
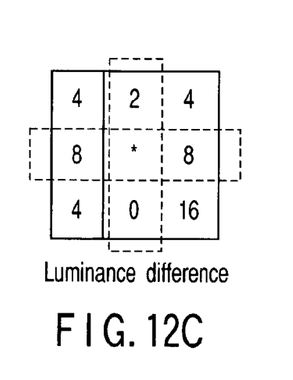

FIGS. 12A to 12D are views for explaining definition of direction-dependent SF factors. The differences of intensity between a pixel S of interest (FIG. 12A) of original pixels, and two neighboring pixels in the x-direction and those in the y-direction, are measured (FIGS. 12B and 12C). Numerical values in FIG. 12B indicate the intensity levels of respective pixels, and those in FIG. 12C indicate measured luminance differences. Note that luminance has 8-bit gradation (0 to 255).

The histograms of intensity differences i are measured in a predetermined region and their values are represented by $S_{0x}(i)$ and $S_{0y}(i)$. Also, the histograms of difference values obtained using an image obtained by executing a convolution process of an original image using a smoothing filter having 3×3 equal coefficients:

$$\begin{bmatrix} 1/9 & 1/9 & 1/9 \\ 1/9 & 1/9 & 1/9 \\ 1/9 & 1/9 & 1/9 \end{bmatrix} \tag{13}$$

as in FIGS. 12A to 12C are represented by $S_{3x}(i)$ and $S_{3y}(i)$. Evaluation values indicating contrasts in respective directions (x- and y-directions) are defined as an integrated value of differences between the histograms of the original image and smoothed image by:

$$SF_x = \sum_{i=0,255} |S_{0x}(i) - S_{3x}(i)| \tag{14}$$

$$SF_y = \sum_{i=0,255} |S_{0y}(i) - S_{3y}(i)|$$

Figure 12D:
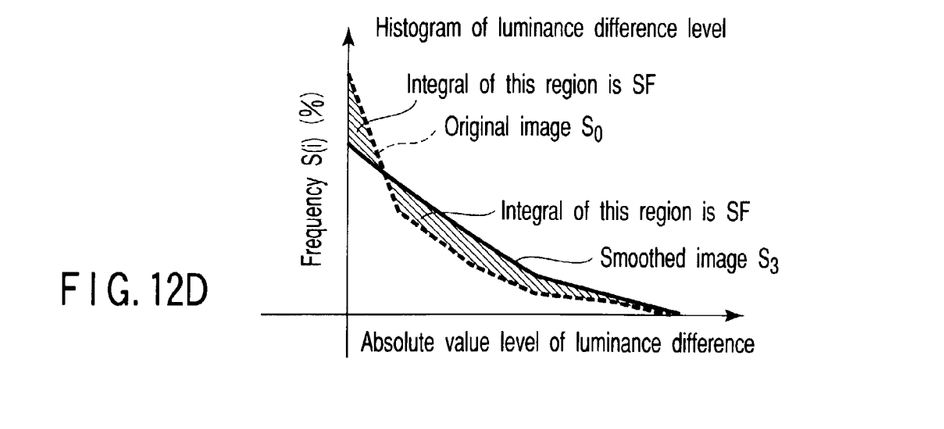

The graph shown in FIG. 12D is a histogram of intensity difference levels, the abscissa plots the absolute value level of intensity difference i, and the ordinate plots the frequency $S(i)$, which is the occurrence of intensity difference i. The area of the hatched portions corresponds to equations (14). The magnitudes of $SF_x$ and $SF_y$ indicate those of contrasts in the respective directions, and also the spreads of the blur. For example, $SF_y < SF_x$ if the spread of the blur in the y-direction becomes large.

Figure 13:
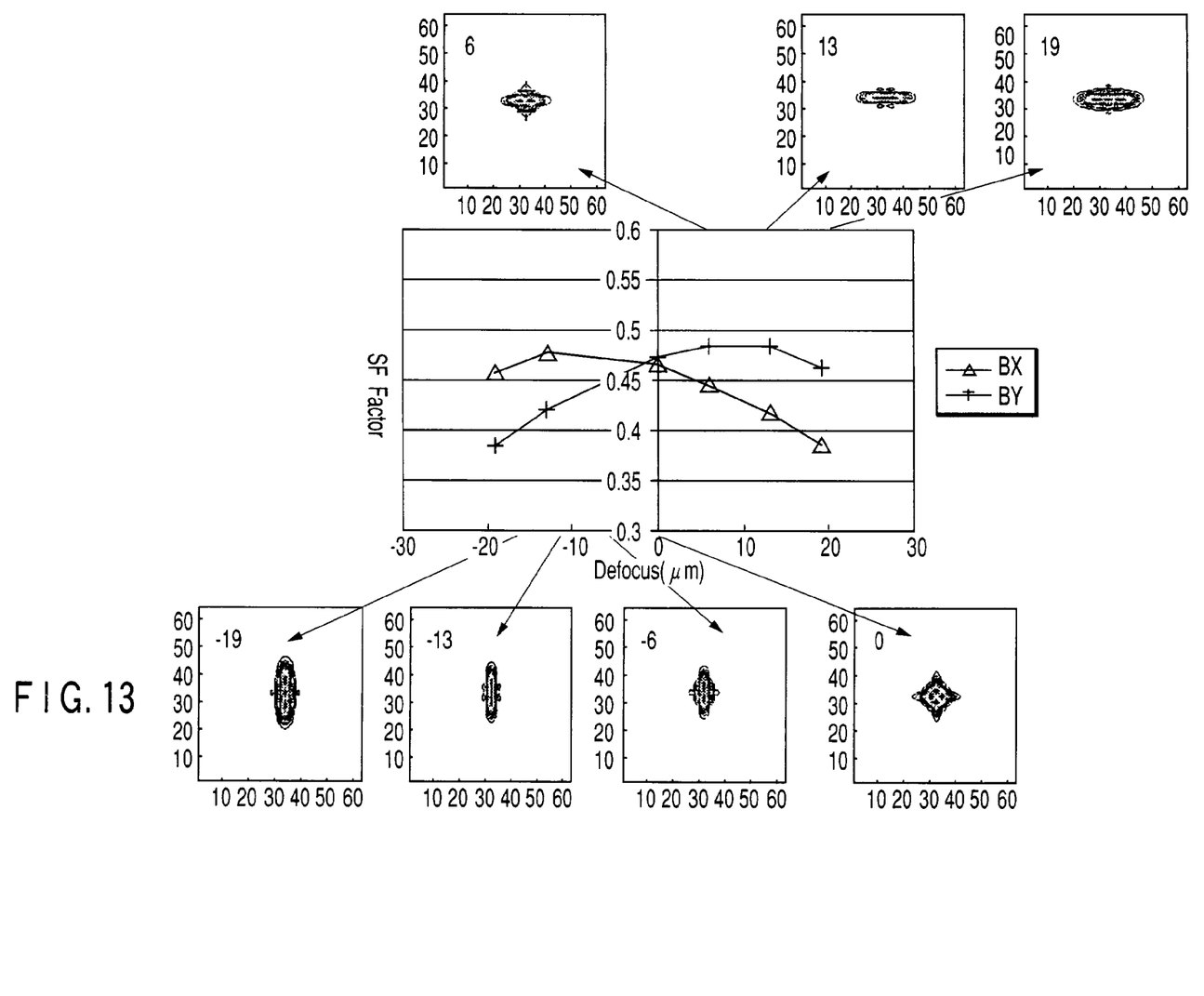
FIG. 13 shows the relationship between PSF asymmetry that represents a blur, and direction-dependent SF factors in the present invention.

FIG. 13 shows the relationship between the PSF asymmetry that represents a blur, and the direction-dependent SF factors. FIG. 13 shows information for only B (blue) for the sake of illustrative simplicity, and R (red) and G (green) also have similar relationships. In FIG. 13, the abscissa plots a change in spread of the PSF in the vertical and horizontal directions using the PSF of an astigmatism, and the ordinate plots direction-dependent SF factors. Note that an SF factor of the B component in the x-direction is represented by BX, and that in the y-direction is represented by BY.

Figure 14:
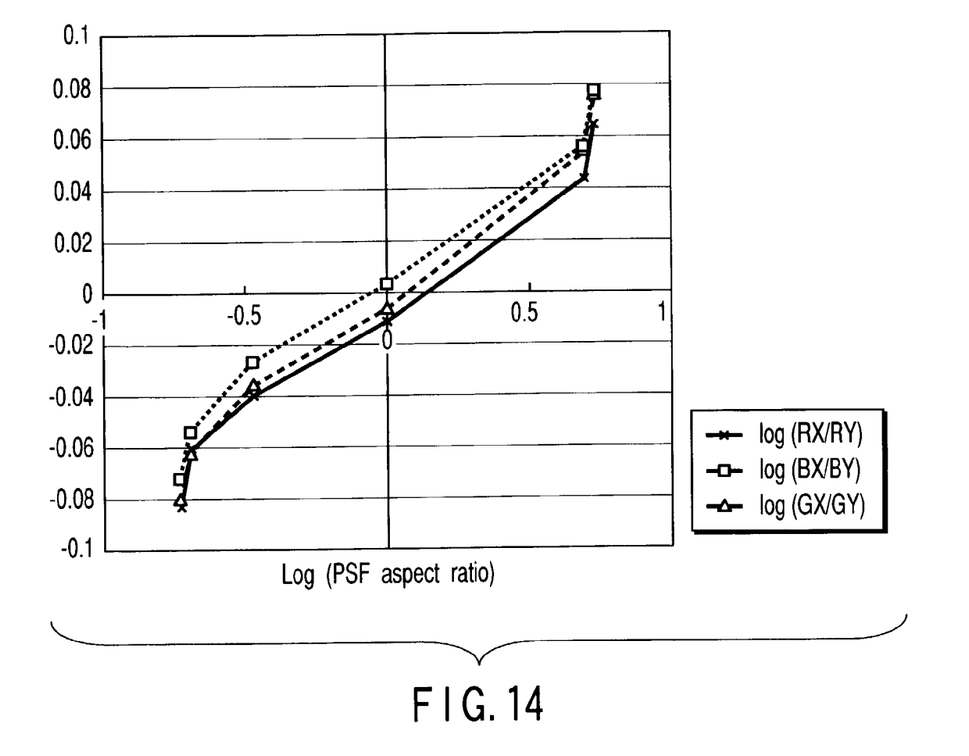
FIG. 14 shows the relationship between the PSF aspect ratio (x-spread/y-spread), and the ratio ($SF_y/SF_x$) of direction-dependent SF factors.

FIG. 14 shows the relationship between the PSF aspect ratio (x-spread/y-spread), and the ratio ($SF_y/SF_x$) of direction-dependent SF factors. The abscissa plots the PSF aspect ratio (log), and the ordinate plots the ratio of SF factors (log). In FIG. 14, SF factors of R, B, and G components in the x-direction are respectively represented by RX, BX, and GX, and those in the y-direction are respectively represented by RY, BY, and GY.

Upon measuring the direction-dependent SF factors in this way, asymmetry of PSF can be evaluated together with the spread of PSF.

As described above, this embodiment is characterized in that a correction value of the focal plane position that takes the spread of the blur and blur rotation asymmetry of the entire image into consideration is calculated to correct the focal plane position.

Figure 15:
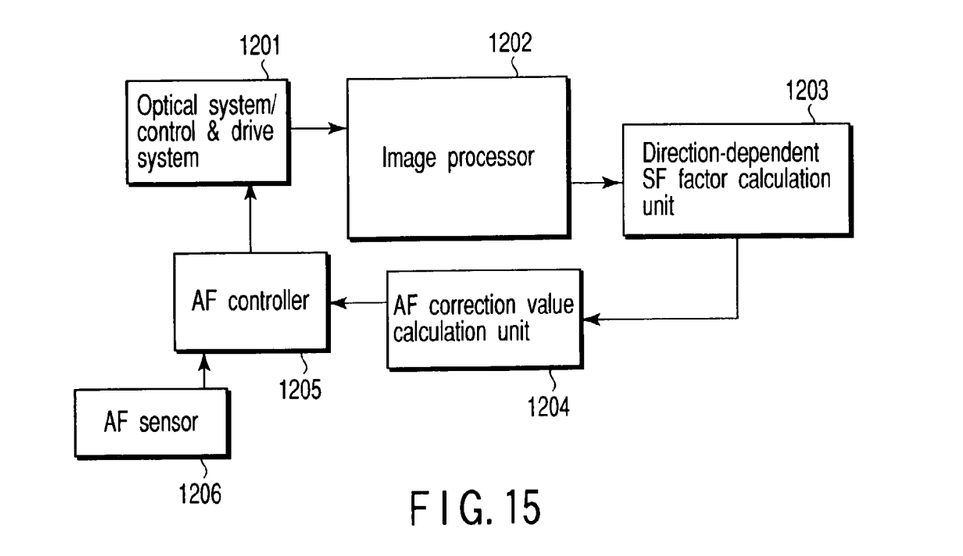
FIG. 15 is a block diagram showing an arrangement for AF correction by a closed loop using direction-dependent SF factors.

FIG. 15 shows an arrangement for AF correction by a closed loop using direction-dependent SF factors. An optical system/control & drive system 1201 includes a lens, imaging element, and lens drive unit that attains zoom/focus operations, and an image signal obtained by this system is converted into 2D image data by an image processor 1202. A direction-dependent SF factor calculation unit 1203 calculates direction-dependent SF factors for respective image locations using the aforementioned method. An AF correction value calculation unit 1204 calculates a correction value of the focal plane position, i.e., that of a focus position using the calculated direction-dependent SF factors. An AF sensor 1206 is a sensor used to attain AF, and performs a normal AF operation. An AF controller 1205 calculates an AF value which takes the AF value obtained by the AF sensor 1206 and the correction value calculated by the AF correction value calculation unit 1204 into consideration, and outputs it to the optical system/control & drive system 1201.

Furthermore, the direction-dependent contrasts of an image taken through the optical system that has undergone the aforementioned AF correction are evaluated again, and feedback control is made so that two evaluation values (1) and (2) below fall within a predetermined range, thus correcting the focal plane position.

(1) The spread of the blur of the entire image is calculated based on a value obtained by weighted average of the direction-dependent contrasts in correspondence with image positions.

(2) The ratios of direction-dependent contrasts are calculated at respective image positions, and the blur asymmetry of the entire image is calculated from the weighted average of amounts (ratios) corresponding to the respective positions.

Figure 16:
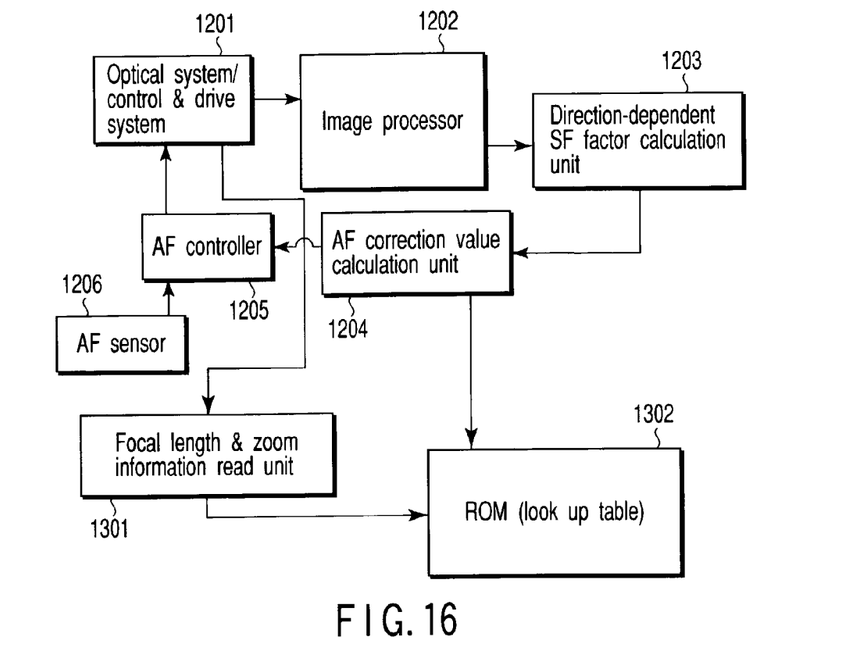
FIG. 16 is a block diagram showing another arrangement for AF correction by a closed loop using direction-dependent SF factors.

FIG. 16 shows another arrangement for AF correction using direction-dependent SF factors. In FIG. 16, a focal length & zoom information read unit 1301 and ROM 1302 are added to the arrangement shown in FIG. 15. The focal length & zoom information read unit 1301 reads out focal length information and zoom information from the optical system/control & drive system 1201. The ROM 1302 stores lookup tables of predetermined AF correction values generated for respective combinations of the readout focal length information and zoom information.

Figure 17:
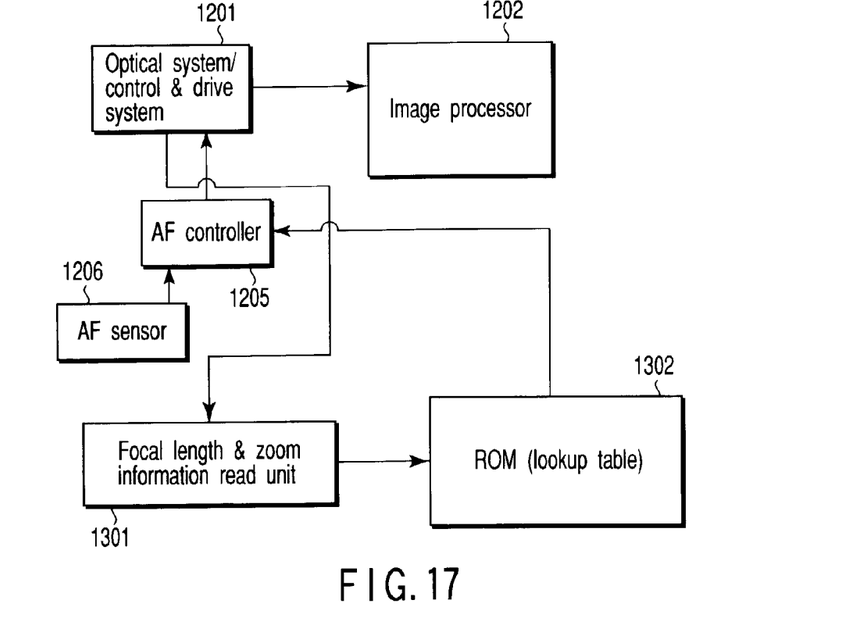
FIG. 17 is a block diagram showing an arrangement when a ROM 1302 having a generated AF correction value LUT is used.

FIG. 17 shows an arrangement related to FIG. 16, when the ROM 1302 having the AF correction value LUTs generated in this way is used. In this case, the LUT in the ROM 1302 is looked up on the basis of the focal length and zoom information from the focal length & zoom information read unit 1301 to find an AF correction value, and that correction value is passed to the AF controller 1205.

Using such method, the spread and asymmetry of the PSF are evaluated based on the actually measured values of the lens without measuring the PSF itself, and AF correction suitable for an image process (post-process) using a rotation symmetric convolution filter can be implemented.

Furthermore, as in the first and second embodiments, according to the third embodiment, since the imager plane of the imaging system is corrected using the means for evaluating the asymmetry of the PSF in consideration of the characteristics of the sharpen filter having rotation symmetric coefficients, the resolution in an off-axis region where the PSF asymmetry becomes large can be improved compared to the conventional apparatus.

According to the present invention, even a sharpen filter having rotation symmetric coefficients can improve deterioration of image quality in a region separated from the optical axis.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A correction data generation method of generating correction data used to correct a focal plane position of a lens in consideration of symmetry of a spread of PSF (point spread function) in an optical system, comprising:

a binarization step of binarizing an intensity of the PSF using a predetermined threshold value level;

a minimum circle calculation step of calculating a minimum circle that circumscribes the PSF binarized in the binarization step for each of a plurality of regions of an image;

a PSF evaluation step of evaluating the PSF of the entire image on the basis of a weighted average value of radii of the minimum circles for the plurality of regions of the image, which are calculated in the minimum circle calculation step; and a correction data calculation step of calculating correction data used to correct the focal plane position of the lens on the basis of an evaluation value acquired in the PSF evaluation step.

2. A method according to claim 1, wherein the weight is given in accordance with a distance from a center of an image plane.

3. A correction data generation method of generating correction data used to correct a focal plane position of a lens in consideration of symmetry of PSF in an optical system, comprising:

a blob formation step of binarizing the intensity of PSF images with an adaptive threshold level and forming blobs;

a measurement step of measuring perimeters and areas of the blobs of the PSF images binarized in the blob formation step for a plurality of regions of an image;

a calculation step of calculating ratios between the perimeters and areas of the blobs for the plurality of regions of the image calculated in the measurement step;

a PSF evaluation step of evaluating the PSF of the entire image on the basis of the weighted average value of the calculated ratios between perimeters and areas for the plurality of regions of the image; and a correction data calculation step of calculating correction data used to correct the focal plane position of the lens on the basis of an evaluation value acquired in the PSF evaluation step.

4. A method according to claim 3, wherein the weight is given in accordance with a distance from a center of an image plane.

5. A correction data generation method of generating correction data used to correct a focal plane position of a lens in consideration of symmetry of PSF in an optical system, comprising:

a binarization step of binarizing an intensity of the PSF using a predetermined threshold value level;

an ellipse calculation step of calculating an ellipse that circumscribes the PSF binarized in the binarization step;

a ratio calculation step of calculating a ratio between major and minor axes (feret ratio) of the ellipse calculated in the ellipse calculation step for each of a plurality of regions of an image;

a PSF evaluation step of evaluating the PSF of the entire image on the basis of a weighted average value of feret ratios for the plurality of regions of the image calculated in the ratio calculation step; and a correction data calculation step of calculating correction data used to correct the focal plane position of the lens on the basis of an evaluation value acquired in the PSF evaluation step.

6. A method according to claim 5, wherein the weight is given in accordance with a distance from a center of an image plane.

7. A correction data generation method of generating correction data used to correct a focal plane position of a lens in consideration of symmetry of PSF in an optical system, comprising:

a step of calculating direction dependence of a contrast distribution of an image taken through the optical system for a plurality of regions of an image; and a step of correcting the focal plane position of the optical system to minimize the calculated direction dependence of the contrast distribution of the image in the entire image, wherein:

the step of calculating the direction dependence for the plurality of regions of the image, comprises:

a step of calculating edge energies for respective directions on the basis of differences between a pixel of interest and pixels which neighbor the pixel of interest in a specific direction in a predetermined region;

a step of evaluating a spread of a PSF in the predetermined region on the basis of absolute values of the calculated edge energies, and evaluating blur asymmetry on the basis of a ratio of the edge energies in the respective directions; and a step of correcting the focal plane position of the lens so that evaluation values of the spread and asymmetry of the PSF fall within a predetermined range, and the step of calculating the edge energies for respective directions in the predetermined region, includes the step of:

evaluating contrast on the basis of absolute values of evaluation values, which represents contrasts in respective direction and are given by:

$$SF_x = \sum_{i=0,255} |S_{0x}(i) - S_{3x}(i)|$$

$$SF_y = \sum_{i=0,255} |S_{0y}(i) - S_{3y}(i)|$$

where $S_{0x}(i)$ and $S_{0y}(i)$ are histograms of difference values i between a pixel of interest, and horizontally and vertically neighboring pixels, and $S_{3x}(i)$ and $S_{3y}(i)$ are histograms of difference values similarly obtained in an image that has undergone a smoothing filter process to reduce high-frequency components of a spatial frequency of the image, and evaluating direction dependence of the contrast on the basis of a ratio $SF_x/SF_y$ of the contrasts in the respective directions.

8. An imaging apparatus comprising:
a controller which controls a focal point of a lens;
a correction data storage unit which stores correction data of a focal point, which is generated in consideration of symmetry of a spread of a PSF (point spread function) in an optical system;
a focal plane correction unit which corrects the focal plane position set by said controller on the basis of the correction data stored in said correction data storage unit; and
an imaging lens having a function of changing an aperture value and a zoom ratio, wherein:
said correction data storage unit stores correction data corresponding to the aperture value and the zoom ratio of said imaging lens, and said apparatus further comprises an interpolation calculation unit which calculates correction data corresponding to the aperture value and the zoom ratio of said imaging lens on the basis of the correction data stored in said correction data storage unit.

9. An imaging apparatus comprising:
a controller which controls a focal point of a lens;
a correction data storage unit which stores correction data of a focal point, which is generated in consideration of symmetry of a spread of a PSF (point spread function) in an optical system;
a focal plane correction unit which corrects the focal plane position set by said controller on the basis of the correction data stored in said correction data storage unit; and
an imaging lens having a function of changing an aperture value and a zoom ratio, wherein:
said correction data storage unit stores correction data corresponding to the aperture value and the zoom ratio of said imaging lens, and said apparatus further comprises an interpolation calculation unit which calculates correction data corresponding to the aperture value and the zoom ratio of said imaging lens on the basis of the correction data stored in said correction data storage unit, and
said imaging lens has a storage unit which stores the correction data, and supplies the correction data to said controller to correct the focal plane position.

10. An imaging apparatus comprising:
a controller which controls a focal point of a lens;
a correction data storage unit which stores correction data of a focal point, which is generated in consideration of symmetry of a spread of a PSF (point spread function) in an optical system;
a focal plane correction unit which corrects the focal plane position set by said controller on the basis of the correction data stored in said correction data storage unit;
an imaging lens having a function of changing an aperture value and a zoom ratio; and
a recovery unit which recovers sharpness of an image using a sharpen filter having rotation symmetric coefficients, wherein:

said correction data storage unit stores correction data corresponding to the aperture value and the zoom ratio of said imaging lens, and said apparatus further comprises an interpolation calculation unit which calculates correction data corresponding to the aperture value and the zoom ratio of said imaging lens on the basis of the correction data stored in said correction data storage unit, and said imaging lens has a storage unit which stores the correction data, and supplies the correction data to said controller to correct the focal plane position.

11. An imaging apparatus for correcting a focal plane position of a lens using correction data generated by a correction data generation method, which includes:

upon generating correction data used to correct a focal plane position of a lens in consideration of symmetry of PSF in an optical system, a step of calculating direction dependence of a contrast distribution of an image taken through the optical system for a plurality of regions of an image; and a step of correcting a focal plane position of the optical system to minimize the calculated direction dependence of the contrast distribution of the image in the entire image, said apparatus comprising:

a controller which controls a focal point of the lens;

a focal plane correction unit which corrects a focal plane position set by said controller on the basis of the correction data; and a recovery unit which recovers sharpness of an image using a sharpen filter having rotation symmetric coefficients with respect to image data taken through the lens, the focal plane position of which has been corrected by said focal plane correction unit.

12. A correction data generation method of generating correction data used to correct a focal plane position of a lens in consideration of symmetry of PSF in an optical system, comprising:

a step of calculating direction dependence of a contrast distribution of an image taken through the optical system for a plurality of regions of an image; and a step of correcting the focal plane position of the optical system to minimize the calculated direction dependence of the contrast distribution of the image in the entire image, wherein:

the step of calculating the direction dependence for the plurality of regions of the image, comprises:

a step of calculating edge energies for respective directions on the basis of differences between a pixel of interest and pixels which neighbor the pixel of interest in a specific direction in a predetermined region;

a step of evaluating a spread of a PSF in the predetermined region on the basis of absolute values of the calculated edge energies, and evaluating blur asymmetry on the basis of a ratio of the edge energies in the respective directions; and a step of correcting the focal plane position of the lens so that evaluation values of the spread and asymmetry of the PSF fall within a predetermined range.

* * * * *